United States Patent
Jones

(10) Patent No.: US 7,134,597 B1
(45) Date of Patent: Nov. 14, 2006

(54) SYSTEM FOR HANDICAPPED ACCESS TO VOTING BALLOTS

(75) Inventor: Douglas W. Jones, Iowa City, IA (US)

(73) Assignee: University of Iowa Research Foundation, Iowa City, IA (US)

(*) Notice: Subject to any disclaimer, the term of this patent is extended or adjusted under 35 U.S.C. 154(b) by 467 days.

(21) Appl. No.: 10/227,159

(22) Filed: Aug. 23, 2002

(51) Int. Cl.
*G06K 17/00* (2006.01)

(52) U.S. Cl. ........................ 235/386; 235/375

(58) Field of Classification Search ............. 235/386, 235/50 A–50 B, 50 R, 51, 57, 54 A–54 F, 235/55 E; 705/12
See application file for complete search history.

(56) References Cited

U.S. PATENT DOCUMENTS

| | | | | |
|---|---|---|---|---|
| 3,944,788 A * | 3/1976 | Comisar et al. | ........... | 235/54 F |
| 4,236,066 A * | 11/1980 | Olmstead et al. | ............. | 235/51 |
| 4,290,141 A * | 9/1981 | Anderson et al. | ............. | 725/24 |
| 4,404,764 A | 9/1983 | Wills et al. | ................. | 40/124.1 |
| 4,807,908 A | 2/1989 | Gerbel | | |
| 5,206,486 A * | 4/1993 | Stephens et al. | ............... | 235/51 |
| 5,260,550 A | 11/1993 | Rapp et al. | .................... | 235/50 |
| 5,536,170 A | 7/1996 | Murphy | ....................... | 434/113 |
| 5,585,612 A | 12/1996 | Harp, Jr. | ....................... | 235/51 |
| 5,635,726 A * | 6/1997 | Zavislan et al. | ....... | 250/559.44 |
| 5,666,765 A | 9/1997 | Sarner et al. | ................ | 52/36.1 |
| 5,821,508 A | 10/1998 | Willard | ........................ | 235/51 |
| 6,485,306 B1 * | 11/2002 | Yeh | ............. | 434/155 |
| 6,892,944 B1 * | 5/2005 | Chung et al. | ............... | 235/386 |
| 2002/0092908 A1 * | 7/2002 | Chumbley | ................. | 235/386 |
| 2003/0001015 A1 | 1/2003 | Rouverol | | |
| 2003/0136836 A1 * | 7/2003 | DeBlase | ..................... | 235/386 |
| 2003/0173404 A1 * | 9/2003 | Chung et al. | ............... | 235/386 |

* cited by examiner

*Primary Examiner*—Kimberly D. Nguyen
(74) *Attorney, Agent, or Firm*—Needle & Rosenberg, P.C.

(57) ABSTRACT

A voting system that allows voters who may be blind or otherwise disabled to use election ballots without needing to see the ballot. The present invention provides a balloting system which presents and holds an election ballot while allowing a voter to cast and inspect votes. The system provides audible or tactile feedback when voting targets are probed with a wand or other pointing means. The feedback can comprise information pertaining to a candidate at a position on the ballot. The feedback can also comprise information pertaining to a mark that may or may not have been made on the ballot.

27 Claims, 5 Drawing Sheets

SYSTEM FOR HANDICAPPED ACCESS TO VOTING BALLOTS

BACKGROUND OF INVENTION

1. Field of the Invention

The present invention generally relates to a means, method, and apparatus for allowing voters who are blind or otherwise disabled to use election ballots without needing to see the ballot. More specifically, the invention provides a balloting system which presents and holds an election ballot while allowing a voter to cast and inspect votes. The system provides audible or tactile feedback when voting targets are probed with a wand or other pointing means. The feedback can comprise information pertaining to a candidate at a position on the ballot. The feedback can also comprise information pertaining to a mark that may or may not have been made on the ballot.

2. Background of the Invention

Most recent work on handicapped access to voting systems has assumed that direct recording electronic (DRE) voting machines are required if a reasonable standard of accessibility for handicapped voters is desired. DRE voting machines are an electronic implementation of the mechanical lever systems. As with the lever machines, there is no ballot; the possible choices are visible to the voter on the front of the machine. The voter directly enters choices into electronic storage with the use of a touch-screen, push-buttons, or similar device. An alphabetic keyboard is often provided with the entry device to allow for the possibility of write-in votes. The voter's choices are stored in these machines via a memory cartridge, diskette or smart-card and added to the choices of all other voters. (Federal Election Commission at http://www.fec.gov/pages/dre.htm)

The primary object of this invention is an optical mark-sense voting system that can meet reasonable standards for handicapped accessibility. This system can allow most blind and otherwise disabled voters to cast votes and to inspect votes cast using marks on a commonplace paper ballot designed for machine tabulation using a mark-sense tabulation system. The system can also readily be adapted for use with punched-card ballot systems, or other types of ballot systems. Additionally, the system can be adapted for use in betting in lotteries, racetracks, educational testing, and any other context where punched-card, mark-sense, or equivalent forms are used.

The complete system disclosed by the present invention is comprised of a plurality of tools, some of which meet the needs of only one class of handicap, while others meet the needs of broad ranges of handicaps. The present invention is capable of using existing ballot designs and can therefore be deployed without substantial expenditure. The total cost of the complete suite of tools may be substantially less than other alternatives.

SUMMARY OF THE INVENTION

With the drawbacks of adopting radical new handicapped-accessible voting systems in mind, the present invention provides a highly cost effective means of adapting current voting systems so that they can be used by handicapped individuals.

Generally speaking, an assisted voting system incorporating the present invention includes a first means for holding and presenting a ballot; a second means for pointing to positions on the ballot; a third means for detecting the position of the pointing means with respect to a voting target; a fourth means for determining if a voting target proximate to the pointing means has been marked; and a feedback means responsive to the determining means. Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION OF THE INVENTION

Throughout this specification, reference to a voting target shall refer to an area of a ballot where the voter is expected to make a mark when voting for a particular candidate. Additionally, reference to a microcontroller shall refer to any processing or controlling device comprising a processor, data memory, and program memory either on a single chip or on multiple chips.

Figure 1:
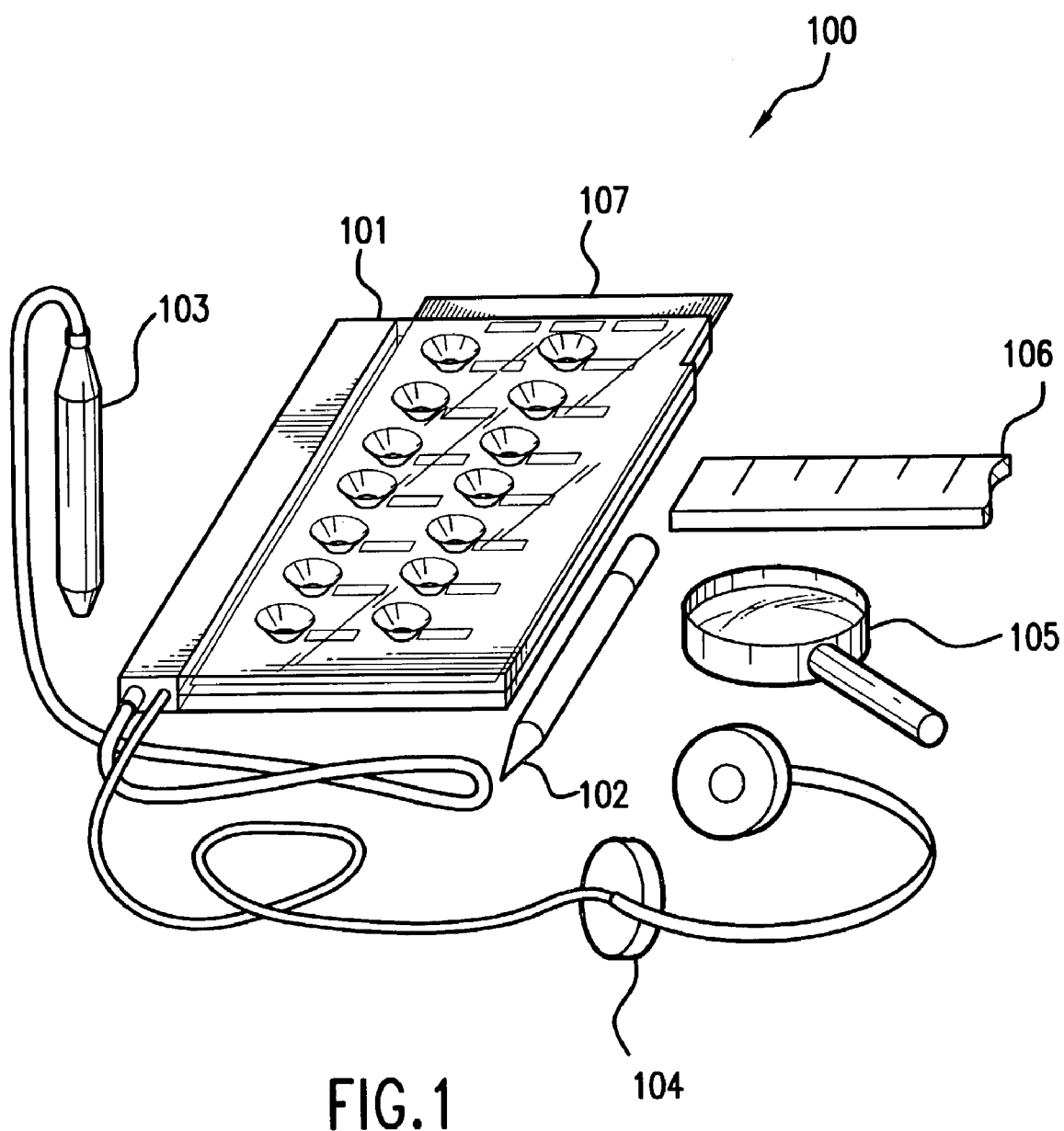
FIG. 1 depicts an exemplary suite of components in accordance with the invention.

FIG. 1 depicts an exemplary assisted ballot system 100 in accordance with an embodiment of the invention. A ballot holder 101 holds and presents a ballot 107 for the voter. In one embodiment, the voter can use a pencil 102 for marking the ballot 107. In other embodiments, the voter can use any marking tool suitable for darkening voting targets on a machine-readable form, punching though a punched-card ballot, or the like. A wand 103 can be used to elicit audible or tactile responses from the system 100 regarding the position of the wand 103 and the status of voting targets proximate to the wand 103. This audible information can be provided through speakers in the ballot holder 101, through headphones 104, or any other means of producing sound. Additionally, a magnifying glass 105 or a ruler 106 can be used by a voter to aid in the process.

Figure 2:
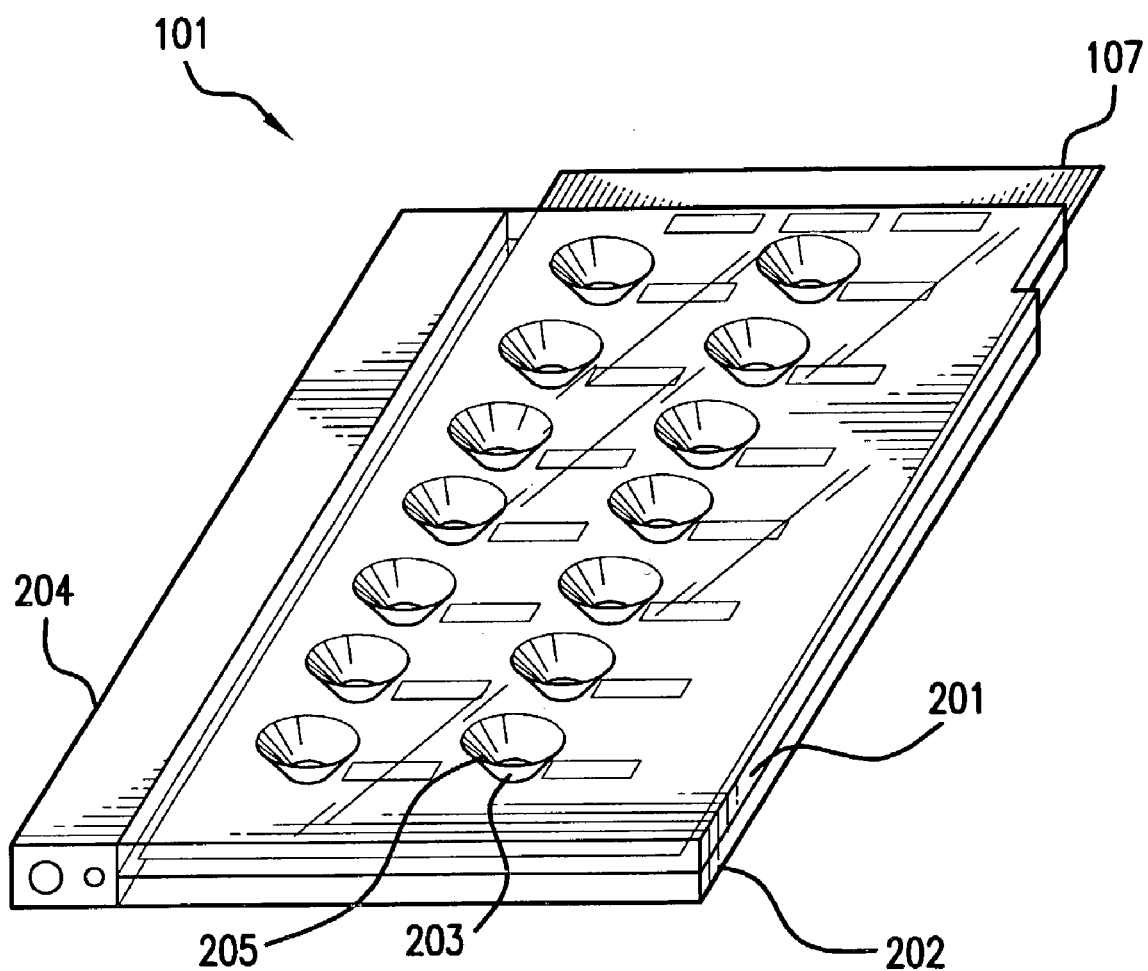
FIG. 2 depicts an exemplary ballot holder in accordance with the invention.

FIG. 2 depicts an exemplary ballot holder 101 in accordance with the invention. The ballot holder consists of a top transparent plastic mask 201 and a bottom transparent plastic mask 202. The ballot 107 is seated between the top and bottom masks 201, 202. In one embodiment, the top and bottom masks 201, 202 can be joined by an electronics assembly 204 along one edge. One or more voting targets 203 can be accessible at the bottom of one or more holes 205 in the ballot holder 101. These holes 205 can, for example, be cylindrical, spherical, or frustoconical in shape. Additional shapes can be used in cooperation with the marking tool, wand, or other device to help guide it to a voting target 203 at the bottom of the hole 205.

The ballot holder 101 serves to protect the face of the ballot 107 from stray marks as well as preventing marking anywhere but on the voting targets 203. The shallow hole over a voting target 203 helps guide the pencil 102 or other marking instrument to a voting target 203 and constrains a mark to an intended target. A Braille overlay can be provided enabling voters literate in Braille to vote entirely by touch once a ballot 107 is properly inserted in the holder 101.

Figure 4:
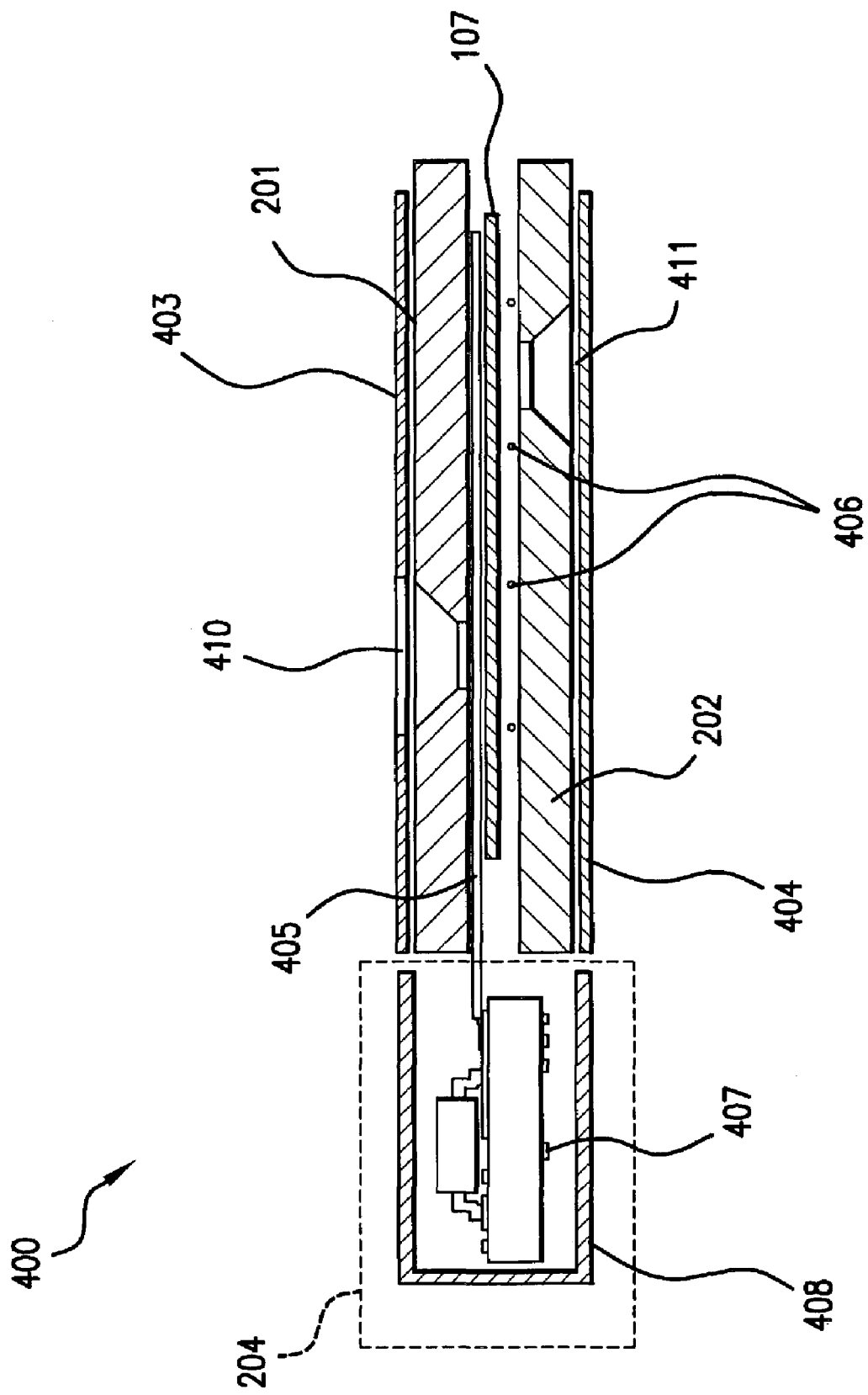
FIG. 4 depicts an exemplary cross-section view of a ballot holder in accordance with the invention.

FIG. 4 depicts an exemplary cross-section view of the ballot holder 101. The top mask 201 and bottom mask 202 are used to support and protect the ballot 107. They can be made of transparent plastic or any other material which is sufficiently sturdy to support and protect the ballot while allowing all relevant portions to be seen. Both masks can contain a hole over any enabled voting position 410 as well as any disabled voting position 411, where a disabled voting position is defined as a position on the ballot that is not used in a given election. The top mask 201 and bottom mask 202 also serve to support the top guard sheet 403, bottom guard sheet 404, horizontal antenna grid 405, and vertical antenna grid 406. In one embodiment, the masks 201, 202 can be removed for cleaning.

The top guard sheet 403 and bottom guard sheet 404 can optionally be attached to the ballot holder 101. In one embodiment, there are no openings in either mask over any disabled voting position. In such an embodiment, guard sheets 403, 404 can be omitted. In another embodiment, there can be one or more holes in either mask over one or more disabled voting positions. In such an embodiment, a top guard sheet 403 and a bottom guard sheet 404 can be used either together or separately to prevent marking of disabled voting positions 411.

The guard sheets 403, 404 serve to protect the surface of the ballot holder 101 from scratches and other insults. The guard sheets 403, 404 can be held in place by self-adhesive properties and/or they can be clipped to the ballot holder 101. Additionally, the guard sheets 403, 404 can be transparent to allow all relevant portions of the ballot 107 to be seen and to facilitate the correct alignment of the ballot 107 with the ballot holder 101. In one embodiment, the guard sheets 403, 404 can be disposable and new sheets can be made for each election.

Figure 3:
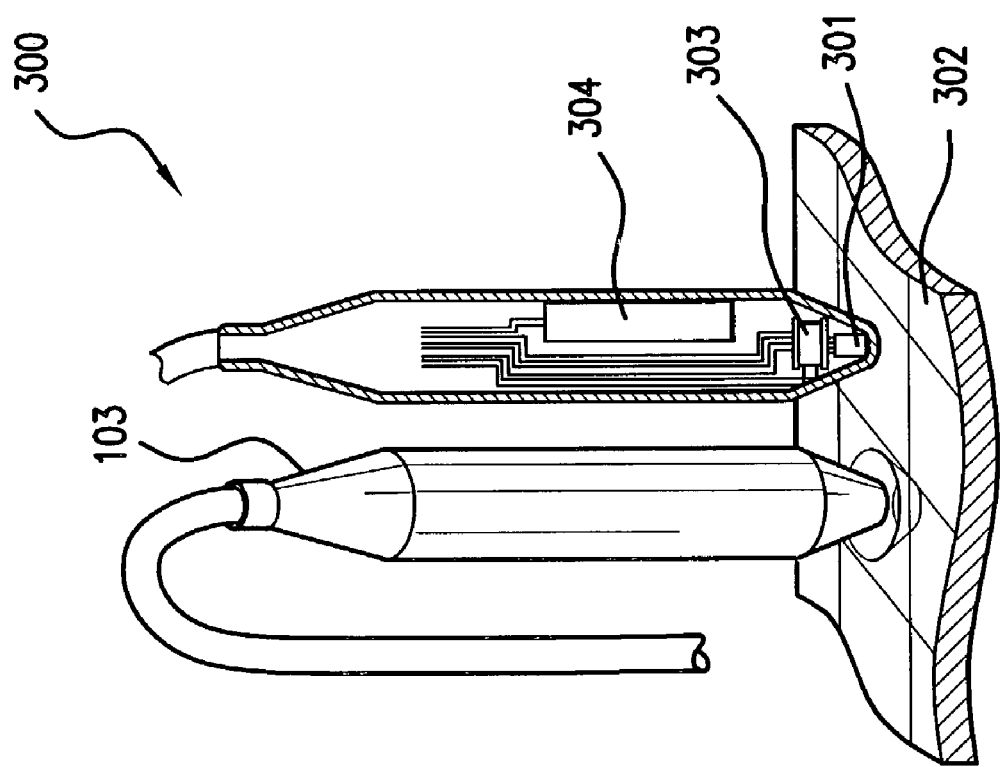
FIG. 3 depicts an exemplary wand in accordance with the invention.

FIG. 3 depicts an exemplary wand 103 which forms a part of a wand positioning subsystem. The wand positioning subsystem has the capability to detect the position of the tip of the wand 103 relative to the voting targets.

In one embodiment, the positioning subsystem can employ an antenna grid 302. In such an embodiment, the wand positioning subsystem can measure the inductive coupling between the antennas 302 and the coil 303 in the wand 103 and thereby detect the position of the wand 103 with respect to the voting targets on the ballot. The antennas 302 can either transmit signals to a coil 303 in the wand 103 which functions as a pickup or they can receive signals from a coil 303 in the wand 103 which functions as a transmitter. The transmitting element will require appropriate drive electronics and the receiving elements will require appropriate sensing electronics. In one embodiment, a tri-state driver for each antenna wire can transmit pulses successively on the antenna loops corresponding to the rows and columns of the ballot. A pickup coil in the wand can be connected to a pulse detector. A microcontroller in the wand positioning subsystem can then determine the timing of transmitted pulses, search for detected pulses and thereby determine the position of the wand.

In one embodiment shown in FIG. 4, antenna wires can be arrayed in both the horizontal 405 and vertical 406 dimensions. The horizontal antenna grid 405 and vertical antenna grid 406 can be arranged anywhere in or on the ballot holder such that they enable the position sensing electronics to detect when the wand is proximate to a voting position on either side of the ballot. In one embodiment, the antennas can be made of fine wire adhered into channels in the masks 201, 202. In another embodiment, the antennas can be made using photoetched copper plating directly on the inside of the masks 201, 202. In yet another embodiment, if the masks are made by the process of injection molding, the antenna grids can be embedded in the masks 201, 202.

Various graphics tablet technologies are well known to embody equivalent position sensing functionality. In one embodiment, the wand position subsystem can use ultrasonic rangefinders with a transducer in the wand and two transducers on adjacent corners of the ballot holder. The time it takes to transmit a signal between wand tip and the two corners can be used to triangulate the position of the tip. In another embodiment, the subsystem can use radio-frequency rangefinders, using the same geometry as the ultrasonic rangefinder above, but with distance between wand and the two corners of the tablet measured by the intensity of the inductive coupling between the coil in the wand tip and the two coils in the corners. In yet another embodiment, the subsystem can use a matrix of infrared beams across the face of the ballot holder, each beam being sent from an infrared LED on one edge to an infrared phototransistor on the opposite edge. Placing the wand-tip or a fingertip on the surface of the mask will break the beam in one row and one column, allowing the position sensing subsystem to locate the point of contact.

The above described position sensing mechanisms are exemplary. The present invention can employ alternative mechanisms of equivalent functionality known to those of ordinary skill in the art.

The voting system can also include a mark-sense subsystem. The mark-sense subsystem can include an optical mark-sensor 301 comprising an infrared proximity sensor. As non-limiting examples, the sensor can be a Fairchild Semiconductor QRD1113, QRD1114, QRE1113.GR or a Panasonic CNB1001, CNB1002 or CNB1302. These sensors comprise an infrared light-emitting diode (LED) and a matched photodetector packaged as a single component. Visible light mark detection can also be used and would require use of a visible-light LED plus an appropriate photodetector. The LED can be powered by electronics present on the ballot holder and the output from the photodetector can be input to the wand positioning subsystem.

In one embodiment, the optical mark sensor 301 can only be active when the position sensing subsystem detects that the wand 305 is proximate to a voting target on a ballot. To distinguish between ambient light and light reflected from the marked or unmarked ballot, the infrared LED can be rapidly blinked and the voltage levels reported by the photodectctor when the LED is on and off can be compared. Thus, the light output from the LED can be modulated and the modulated signal can be sensed by the photodetector to judge the presence or absence of a mark. The use of modulated light can render the system less sensitive to ambient lighting conditions.

If the difference between the photodetector voltages for the LED-on and LED-off conditions approaches zero, the wand may not be detecting reflected light. When the wand is close to unmarked white paper, this difference will be high. If the paper has been marked, this difference will be at an intermediate level. This approach can be used to distinguish marks that are close to the ballot tabulator's threshold of detection. When such a mark is detected, the system can report this condition to the voter. The thresholds used by this invention can be similar or identical to those used by ballot tabulating machines.

The wand 103 can optionally contain a tactile feedback mechanism 304 activated when the wand is pointed at a marked ballot position. As a non-limiting example, tactile sensation can be produced by an electromagnet operating on a spring-mounted weight or by an electric motor turning an eccentric weight on a shaft.

In some embodiments, the wand can also contain a marking or punching apparatus. Thus, the same hand-held device can be used to both make marks and read marks. In one embodiment, voting can be accomplished by pressing down on the wand once the appropriate voting position has been reached. In another embodiment, the wand can have a mark-sensor on one end and a mark-maker (i.e. pencil, marker, punch stylus) on the other end. These embodiments are non-limiting and the present invention can employ alternative combinations of the mark-sensor and mark-maker.

The mark sense subsystem and wand position subsystem both produce output which, when combined, allows the voting system to determine the position of the wand with respect to a voting target and to detect whether a voting target has been marked.

One embodiment of the current invention can incorporate an audio feedback subsystem. The audio feedback subsystem can exist on a dedicated microcontroller or the audio feedback functionality can be incorporated into another microcontroller. The audio feedback subsystem is responsive to input from the mark sensing subsystem and wand position subsystem. In one embodiment, the audio feedback subsystem can use an audio amplifier, a digital signal processor, and a digital memory. Candidate information pertaining to each ballot position can be recorded in the digital memory. Data compression can be used to considerably reduce the amount memory required to store the audio information. In one embodiment, Flash EEPROM memory can be used to store audio information.

Any memory arrays, mark sense, wand positioning, and speech subsystems comprise the principal electronic components of the current invention. In one embodiment, one of more of these components can be combined in one electronics assembly 204. In one embodiment, an electronics assembly 204 can be placed on a separate circuit board. In another embodiment, it can be mounted on a flexible transparent printed circuit board that also includes antenna grids and can be bonded to both the top and bottom masks. Power for the electronic components can be provided by batteries attached to the system or by an external power adapter. If an external power adapter is used, it can also perform the function of recharging the attached batteries. Power conditioning circuitry can be used if necessary.

A cover 408 can be placed over the electronics 407. In one embodiment, this cover can be used to secure the electronics assembly 204, top mask 401 and bottom mask 402.

Figure 5:
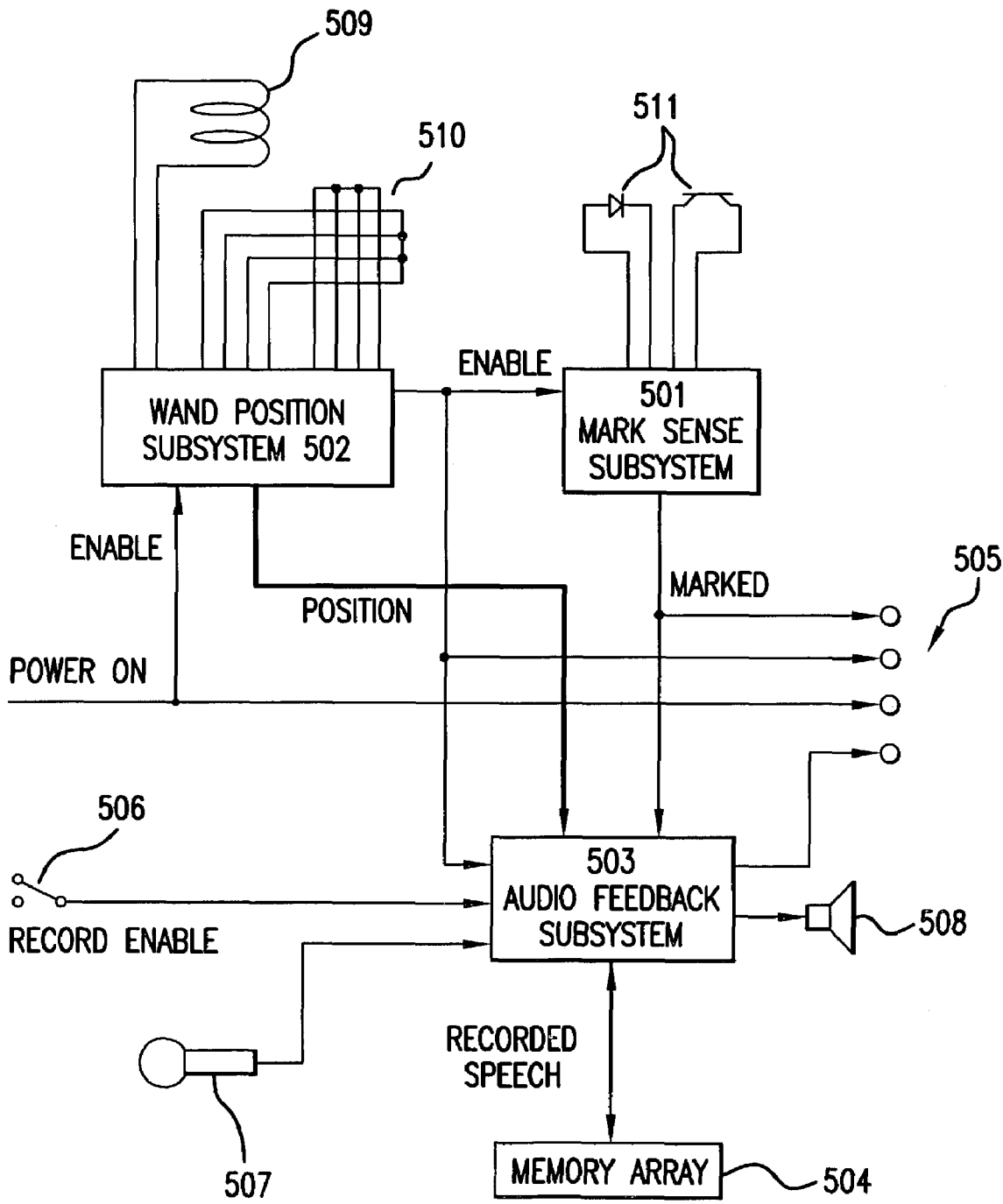
FIG. 5 depicts an exemplary schematic overview of the system in accordance with the invention.

FIG. 5 depicts one possible embodiment of the internal structure of the electronics. The system 500 is self-contained, requiring no external components other than the wand 103, microphone (if not built-in) and headphones 104. The system can be implemented using three separate microcontrollers, as shown in the embodiment depicted in FIG. 5. In this embodiment, the antenna array 510, the coil 509 in the wand 103, and associated microcontroller comprise the wand position subsystem 502; the reflective photosensor in the wand 511 and associated microcontroller comprise the mark sense subsystem 501; and a microcontroller forms the speech subsystem 503. Alternatively, in another embodiment, the system can be implemented using only one microcontroller if subsystem functionality is aggregated into a single microcontroller.

As a security feature, in one embodiment the system can be constructed without using any persistent real-time clocks. The lack of such a clock prevents the system from being programmed to behave differently during testing and elections. Furthermore, if the wand position subsystem and mark-sense subsystems are present in separate microcontrollers, any special control input in an attempt to put the system into an improper operating mode cannot involve interaction of these two systems.

In a further embodiment, the mark-sense subsystem 501 and audio feedback subsystem 503 can be powered down or reset when they are not enabled. Thereby, these systems can begin operating in a known state each time the wand is moved to a new voting position on the ballot. As a result, neither the mark-sense subsystem 501 nor the audio feedback subsystem 503 can contain hidden functions triggered by obscure sequences of inputs. In a further embodiment, the design cannot allow the system to store data in the memory array 504 except when it is in recording mode. In one embodiment, the memory array can be implemented by flash EEPROM. Other forms of data storage can be used. In some embodiments, the memory array can be removable so that programming can be done externally.

In one embodiment, an external voting/record switch 506 and an external microphone 507 are connected to the speech subsystem. The switch 506 can be used to toggle the speech subsystem between voting and recording modes. When in the recording mode, speech recorded using microphone 507 can be stored in the memory array 504. When in the voting mode, the contents of the memory array 504 cannot be changed. In another embodiment, the microphone 507 can be internal to the system. In still another embodiment, the system can sense the presence of a detachable microphone and enter the recording mode when the microphone is plugged in. In one embodiment, the system stores the location of the wand 103 when a given candidate information recording is made. The location of the wand 103 can be stored in the same memory array as the recorded candidate information or it can be stored in a separate memory location.

Status indicators 505 can allow the system to be tested without regard to the information stored by the audio feedback subsystem 503. In one embodiment, a connection for external audio playback 508 can be provided by the audio subsystem. As a non-limiting example, headphones can be connected to the external audio playback connection 508.

Operation of the system invention involves two phases. The first phase comprises setup and preparation. To prepare the system for use, a recording is made for each voting target. This can be accomplished by inserting a ballot into the ballot holder, placing the system into recording mode, and audibly presenting candidate information to the microphone in conjunction with placing the wand proximate to given voting targets.

Once candidate information has been recorded, the system can be placed in voting mode by use of the voting/recording switch. Both the switch and microphone can then be disconnected from the system if detachable units are used.

In the voting phase, the voter or an assistant can first place a ballot in the ballot holder. The voter can then make selections on the ballot, with assistance from the system. The voter can use the wand to point to positions on the ballot. Holes appear over voting targets on the to aid voters in maneuvering the selection tool or wand proximate to the voting target. The system can detect the position of the wand and play the corresponding candidate information previously recorded. The system can also determine if a voting target proximate to the wand has been marked. The marked/unmarked status of a voting target can be reported to the voter by either tactile feedback means in the wand or audible feedback means through headphones or other device for sound production.

As described above, the present invention can also be used with punched-card ballots or other balloting techniques. In the case of punched-card ballots, the pencil 102 can be replaced with a punching stylus and the mark-sense subsystem system can be adapted to detect holes.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

The embodiments described above are given as illustrative examples only. It will be readily appreciated that many deviations can be made from the specific embodiments disclosed in this specification without departing from the invention. Accordingly, the scope of the invention is to be determined by the claims below rather than being limited to the specifically described embodiments above.

What is claimed is:

1. An election voting system comprising:
    a) a top mask and a bottom mask for holding and presenting a ballot, wherein the top mask is transparent and has at least one hole;
    b) a wand for pointing to positions on the ballot;
    c) means for detecting the position of the wand with respect to a voting target;
    d) means for determining if a voting target on the ballot proximate to the wand has been previously marked; and
    e) feedback means responsive to the determining means wherein the feedback means produces a tactile sensation with the wand.

2. The system of claim 1, wherein the top and bottom mask are handheld.

3. The system of claim 1, wherein the feedback means comprises an audible, verbal feedback means.

4. The system of claim 1, wherein the determining means comprises an optical mark sensor.

5. The system of claim 4, wherein the wand comprises a mark-maker.

6. The system of claim 1, wherein a means for initially marking a position on the ballot and the pointing means are both contained within the same device.

7. The system of claim 1, wherein the system further comprises an audio recording means for storing voting target information.

8. The system of claim 7, wherein the system further comprises a means for audibly presenting a voting target proximate to the pointing means.

9. The election voting system of claim 1 wherein the detecting means further comprises:
    a coil in the pointing means; and
    an x-y antenna grid in the holding and presenting means for detecting inductive coupling based on the presence of the coil.

10. An election voting method, the method comprising the steps of:
    a) holding and presenting a ballot between a top and bottom mask wherein the top mask is transparent and has at least one hole;
    b) detecting the position of a wand with respect to a voting target on the ballot;
    c) determining if a voting target on the ballot proximate to the wand has been previously marked; and
    d) providing feedback responsive to the determination of whether a voting target has been marked wherein the feedback is a tactile sensation with the wand.

11. The method of claim 10, wherein top and bottom mask are handheld.

12. The method of claim 10, wherein the step of providing feedback comprises the step of generating an audible, verbal response.

13. The method of claim 10, wherein the step of determining if a voting target on the ballot proximate to the wand has been previously marked further comprises using an optical mark sensor.

14. The method of claim 13, wherein the wand comprises a mark-maker.

15. The method of claim 10, further comprising the step of initially marking a position on the ballot with the wand.

16. The method of claim 10, further comprising the step of recording voting target information.

17. The method of claim 16, further comprising the step of audibly presenting the voting target proximate to the wand.

18. The method of claim 10 wherein the step of detecting the position of a wand further comprises:
    a coil in the pointing means; and
    an x-y antenna grid in the holding and presenting means for detecting inductive coupling based on the presence of the coil.

19. An election voting apparatus, which comprises:
    a) a ballot holder capable of presenting a ballot, the ballot holder having a top mask and a bottom mask, wherein the top mask is transparent and has at least one hole;
    b) a wand for pointing to a position on the ballot;
    c) a position sensing system capable of detecting the position of the wand with respect to a voting target on the ballot;
    d) a mark sensing system capable of determining if a voting target on the ballot has been previously marked; and
    e) a feedback mechanism responsive to the mark sensing system, wherein the feedback mechanism produces verbal audio feedback as to the condition of the voting target.

20. The apparatus of claim 19, wherein the top and bottom mask are handheld.

21. The apparatus of claim 19, wherein the feedback mechanism produces a tactile sensation with the wand.

22. The apparatus of claim 19, wherein the mark sensing system further comprises an optical mark sensor.

23. The apparatus of claim 22, wherein the wand comprises a mark-maker.

24. The apparatus of claim 19, wherein a marking device and the pointing means are both contained within the same device.

25. The apparatus of claim 19, wherein the system further includes an audio recording mechanism for storing voting target information.

26. The apparatus of claim 25, wherein the system further includes a playback mechanism for audibly presenting the voting target proximate to the wand.

27. The apparatus of claim 19 wherein the position sensing system further comprises:

a coil in the pointing means; and an x-y antenna grid in the holding and presenting means for detecting inductive coupling based on the presence of the coil.

\* \* \* \* \*